J. F. KIEFFER.
BRAKE OPERATING MECHANISM.
APPLICATION FILED APR. 7, 1910.
968,957.
Patented Aug. 30, 1910.
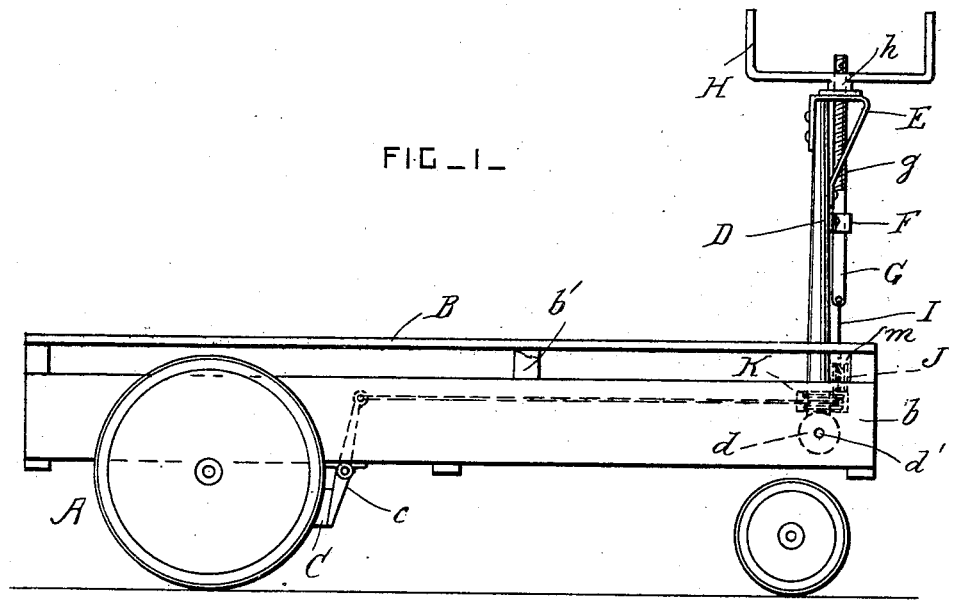
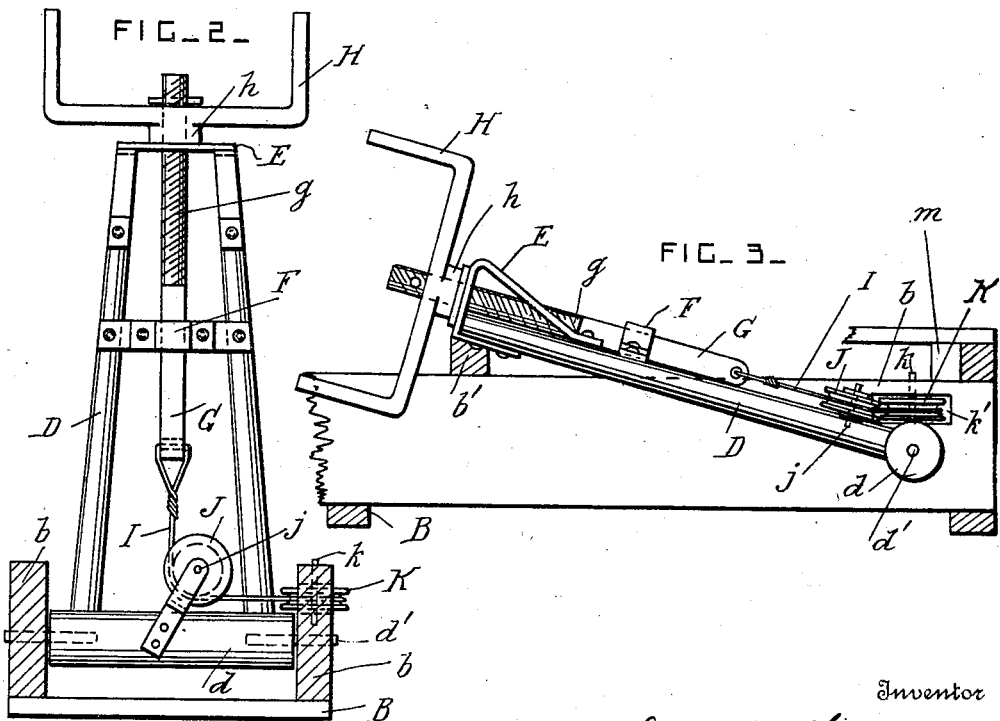
Witnesses
E. B. Corcoran
H. J. Corcoran
Inventor
Jacob F. Kieffer.
By Herbert W. Jenner.
Attorney

UNITED STATES PATENT OFFICE.

JACOB F. KIEFFER, OF PLIMPTON, OHIO.

BRAKE-OPERATING MECHANISM.

968,957.  Specification of Letters Patent.  Patented Aug. 30, 1910.

Application filed April 7, 1910. Serial No. 554,049.

*To all whom it may concern:*

Be it known that I, JACOB F. KIEFFER, a citizen of the United States, residing at Plimpton, in the county of Holmes and State of Ohio, have invented certain new and useful Improvements in Brake-Operating Mechanism; and I do hereby declare the following to be a full, clear, and exact description of the invention, such as will enable others skilled in the art to which it appertains to make and use the same.

This invention relates to mechanism for working the wheel brake of a wagon when used in connection with a hay-rack; and it consists in the novel construction and combination of the parts hereinafter fully described and claimed.

In the drawings, Figure 1 is a side view of portions of a wagon provided with brake operating mechanism according to this invention, and showing the frame raised. Fig. 2 is a front view of the mechanism, drawn to a larger scale. Fig. 3 is a side view of the mechanism showing it folded down.

A is a wagon of any approved construction; and B is a hay-rack of any approved construction which is mounted on the wagon.

C is a wheel brake of any approved construction applied to the wagon, and $c$ is the pivoted lever which works the brake. When a load of hay is placed on the rack it is desirable to be able to work the brake from the top of the load and at its front end, and the novel mechanism is provided for that purpose.

D is a frame formed of suitable uprights and cross-pieces, and having a strong cross-bar $d$ at its bottom. This crossbar $d$ is provided with pivot pins $d'$ which engage with holes in the front end portions of the side pieces $b$ of the hay-rack.

E is a bracket secured to the top end portion of the frame D; and F is a guide secured to the middle portion of the said frame.

G is a guide-bar which is rectangular in cross-section, and which is slidable in the guide F. A screw $g$ projects from the top end of the guide-bar G, and is slidable in a hole in the bracket E. H is a handle provided with a nut $h$ which engages with the upper end portion of the screw $g$ above the bracket E. The screw is preferably provided with a double screw thread to make it quick acting.

I is a flexible connection secured to the lower end of the guide-bar G and operatively connected with the brake-lever $c$. This flexible connection may be a cord, chain, wire or any other similar device.

J is a guide sheave journaled on a pin $j$ which is carried by the lower part of the frame D.

K is a guide sheave journaled on a pin $k$, and arranged in a slot $k'$ in one of the side pieces $b$ of the hay-rack.

The flexible connection I passes over the guide sheaves J and K, and the said guide sheaves are arranged with respect to each other and the pivot pins of the frame, so that the brake can be operated when the frame is in a vertical position, as shown in Fig. 1, and bearing against a stop-bar $m$ on the hay-rack, and also when the frame is turned downward, as shown in Fig. 3.

The frame is arranged vertically when a load of hay is on the rack, and the man on top of the load can then work the brake with facility. When no load is on the rack, the frame is turned downward, as shown in Fig. 3, so that it rests against one of the crosspieces $b'$ of the rack, and the brake can then be operated with the same facility.

Under ordinary circumstances the brake is applied by revolving the handle H, but when the brake requires to be applied suddenly, in an emergency, the handle H is seized and is pulled upon to slide the screw longitudinally in the guide without revolving the handle.

What I claim is:

1. The combination, with a wheeled vehicle provided with a wheel brake, of an upright pivoted to the vehicle frame, a bracket secured to the free end portion of the upright, a screw slidable longitudinally in the said bracket, means for preventing the said screw from revolving, connections between the said screw and wheel brake, and revoluble handle provided with a screw-threaded portion which engages with the projecting end portion of the said screw above the said bracket and which is slid longitudinally with the screw to apply the brake quickly in an emergency.

2. The combination, with a wheeled vehicle provided with a frame and a wheel-brake, of an upright pivoted to one end portion of the said frame, a bracket secured to the upper part of the upright, a rectangular guide secured to the upright below the said bracket, a screw slidable in the said bracket and provided with a rectangular bar which slides in the said guide and prevents the screw from revolving, means for operatively connecting the said bar with the wheel-brake, and a revoluble handle which engages with the projecting end portion of the said screw above the said bracket and which is slid longitudinally with the screw to apply the brake quickly in an emergency.

In testimony whereof I have affixed my signature in the presence of two witnesses.

JACOB F. KIEFFER.

Witnesses:
  LEWIS A. LONG,
  G. F. KANTZER.